United States Patent [19]
Fenner et al.

[11] Patent Number: 6,008,548
[45] Date of Patent: Dec. 28, 1999

[54] PROGRAMMABLE LOGIC CONTROLLER FOR RESONANCE CONTROL IN COMPLEX CAPACITOR SWITCHING

[75] Inventors: Gerald Fenner, Bloomington; Chris Talley, Indianapolis, both of Ind.

[73] Assignee: Cinergy Corp., Plainfield, Ind.

[21] Appl. No.: 09/088,408

[22] Filed: Jun. 1, 1998

Related U.S. Application Data

[60] Provisional application No. 60/059,389, Sep. 19, 1997.

[51] Int. Cl.$^6$ ........................................................ H02J 1/02
[52] U.S. Cl. .......................... 307/105; 307/109; 323/205; 323/208
[58] Field of Search .................................. 307/105, 109; 323/205, 208, 219, 210, 211

[56] References Cited

U.S. PATENT DOCUMENTS

| | | |
|---|---|---|
| 3,859,542 | 1/1975 | Kennedy . |
| 4,055,795 | 10/1977 | Mathieu . |
| 4,139,723 | 2/1979 | Havas ...................................... 323/210 |
| 4,204,150 | 5/1980 | Mathieu . |
| 4,307,331 | 12/1981 | Gyugyi . |
| 4,365,190 | 12/1982 | Pasternack et al. . |
| 4,769,587 | 9/1988 | Pettigrew . |
| 4,771,225 | 9/1988 | Nishikawa ............................... 323/210 |
| 5,134,356 | 7/1992 | El-Sharkawi et al. ................... 323/209 |
| 5,399,955 | 3/1995 | Glaser et al. . |
| 5,440,442 | 8/1995 | Taylor . |
| 5,670,864 | 9/1997 | Marx et al. . |
| 5,719,757 | 2/1998 | Beyerlein et al. ....................... 323/211 |
| 5,736,838 | 4/1998 | Dove et al. .............................. 323/210 |

*Primary Examiner*—Albert W. Paladini
*Attorney, Agent, or Firm*—Woodard, Emhardt, Naughton Moriarty & McNett Patent and Trademark Attorneys

[57] ABSTRACT

A system for regulating the voltage by switching capacitor banks and for preventing damage due to harmonic resonance in an AC power supply line after a capacitor bank is switched. The system includes a detector for detecting the harmonic distortion in the supply line, and multiple capacitor banks connected in parallel to the supply line. At least one switch is in series with each capacitor bank to connect or disconnect the capacitor bank to the supply line. A controller operates the switches and receives input from the detector. After a capacitor bank is switched to improve conditions in the supply line, the controller compares the total harmonic distortion to an action threshold and switches capacitor banks as programmed when the total harmonic distortion exceeds the action threshold for a predetermined period of time in order to avoid a resonant condition that could cause damage to equipment.

14 Claims, 10 Drawing Sheets

PROGRAMMABLE LOGIC CONTROLLER FOR RESONANCE CONTROL IN COMPLEX CAPACITOR SWITCHING

This application claims priority to provisional application Ser. No. 60/059,389 filed Sep. 19, 1997, which is hereby incorporated by reference.

FIELD OF THE INVENTION

This invention relates generally to electrical power systems and more particularly to a programmable logic controller for capacitor switching to adjust reactive compensation and harmonic distortion.

BACKGROUND OF THE INVENTION

It is well known to electrical utilities and their industrial customers that alternating current (AC) electrical systems commonly have a reactive load, i.e. a load having an inductive or capacitive component. Most commonly the reactive load is inductive. Due to the effects of these loads and the elements of the electrical system, there is a difference between the real power available to the load and the apparent power supplied by the source. This difference is referred to as reactive power, measured in volt-amperes reactive or VAR. The power factor (PF) is the ratio of real power (W) over reactive power (VAR). It is preferable to maintain the power factor as close to one as possible. An inductive load causes a lagging reactive current since the voltage leads the current, and a capacitive load causes a leading current since the current leads the voltage.

Leading PF loads are caused by elements such as fluorescent lightbulbs; however, most industrial installations use significant numbers of motors or equipment, such as air conditioners, which cause inductive loads. This has a significant effect on the power factor for industrial users where it is known to have inefficient power factors as low as 0.6. This is undesirable from the utility or source's standpoint because the utility must supply the apparent power while only being able to charge for the real power percentage. Additionally, the excess, unused reactive power on the line causes excess losses and heat requiring larger equipment or more generation. Other effects may include poor voltage regulation at transformers or false signals to overvoltage regulation devices.

To encourage industries to maintain a power factor approaching one (unity), utilities often charge industries a premium for power supplied when the power factor falls below a set level such as 0.9. As such, it is also in the industries' best interest to maintain a power factor near unity. A near unity power factor also allows more constant and efficient transmission of power over smaller lines or allows more power to be distributed over the lines. Although possible for residential installations, normally residential users do not carry sufficient inductive loads to justify power factor compensation.

Capacitors installed at the industrial user's location are an efficient way to compensate for lagging current but traditionally have been subject to certain disadvantages. In particular, the compensation of a capacitor cannot be varied over time, while the inductive load may vary. Accordingly, the capacitor may be insufficient for a varied demand, or may provide excess correction leading to an overvoltage situation. Utility company or power engineers in the past have calculated the correction for an industrial user and installed single or multiple capacitors, but have not had the ability to adjust the capacitance in response to drastic changes in power factors or operation outside of the designed range.

Recently, the ability to dynamically add and subtract capacitors or capacitor banks has been envisioned using a microprocessor type of controller. For example, U.S. Pat. No. 5,670,864 to Marx describes a controller which measures the phase angle variation and adaptively connects or disconnects capacitor banks. U.S. Pat. No. 5,469,045 to Dove illustrates a high speed microprocessor which senses current and voltage and corrects the power factor by connecting and disconnecting capacitor banks.

Although these designs address some of the problems in correcting power factor, they do not solve all of the problems. In particular, a resonance problem can arise in a power system when a controller switches a capacitor into or out of a system. When a capacitor is switched, normally there is a ringing transient. This ringing transient should attenuate in a few cycles unless the frequency is the same as a harmonic generated by the customer thereby producing resonance which results in a high harmonic level. The percentage of harmonic energy or distortion is called the Total Harmonic Distortion (THD). If the THD is too high and remains that way, there can be damage to the system such as overload of the capacitor banks or insulation damage to the customers' equipment. Electrical customers are required to ensure that the THD does not exceed five percent (5%) due to their load. Utilities may charge customers a premium or, in a worst case, disconnect a customer if the THD is too high.

Normally a study is carried out to size the capacitor banks to the installation in order to minimize the probability of resonance. Unfortunately this model may be inaccurate, or changes may be made to the system which result in errors in the model and the potential for damage. Additionally the model becomes more complex when capacitor banks are dynamically switched into or out of the system. Accordingly, there is a need for an apparatus which can be used in combination with a capacitor bank switching controller, which minimizes or prevents electrical harmonic resonance thereby preventing high levels of THD due to resonance in an electrical system after a capacitor bank is switched.

SUMMARY OF THE INVENTION

A system for minimizing resonance in an AC power supply line after a capacitor bank is switched, including a detector for detecting the harmonic distortion in a supply line and a plurality of capacitor banks in parallel to the supply line. A plurality of switches is provided wherein at least one switch is in series with each of said capacitor banks to selectively connect or disconnect each of the capacitor banks to the supply line. A controller is operatively coupled to the switches and receives input from the detector. The controller adds or removes capacitor banks from the circuit if an overvoltage or undervoltage situation occurs in order to provide a more nearly constant AC voltage. Once a capacitor bank is switched, the controller compares the total harmonic distortion to an action threshold and closes one of said switches to connect a capacitor bank if the total harmonic distortion exceeds the action threshold for a predetermined period of time. The controller sequentially opens each of the plurality of switches to remove capacitor banks if the detected total harmonic distortion continues to exceed the first reference value for a predetermined time period after the one switch is closed or after each of the switches is opened. The comparison and opening repeats as long as the THD exceeds the action threshold and capacitor banks remain connected to the circuit.

Accordingly, it is one object of this invention to provide a system that maintains a more nearly constant AC voltage.

It is a further object of this invention to provide a system which prevents resonance from causing damage to a power supply system.

It is another object of the present invention to provide a system which adds or subtracts capacitor banks from a circuit in order to minimize resonance.

Further objects, features and advantages of the present invention shall become apparent from the detailed drawings and description provided herein.

DESCRIPTION OF THE PREFERRED EMBODIMENT

For the purposes of promoting an understanding of the principles of the invention, reference will now be made to the embodiment illustrated and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

The present invention relates to an apparatus for minimizing resonance in an AC power supply system after a capacitor bank is switched into or out of the system to more nearly supply a constant voltage with a unity power factor. When a capacitor bank is switched in a system, a ringing transient is created which attenuates in a few cycles unless the frequency is the same as a natural harmonic frequency created by the electrical customer. The present invention measures the harmonic distortion of such a system and switches capacitor banks to avoid damage caused by excess Total Harmonic Distortion (THD).

Figure 1:
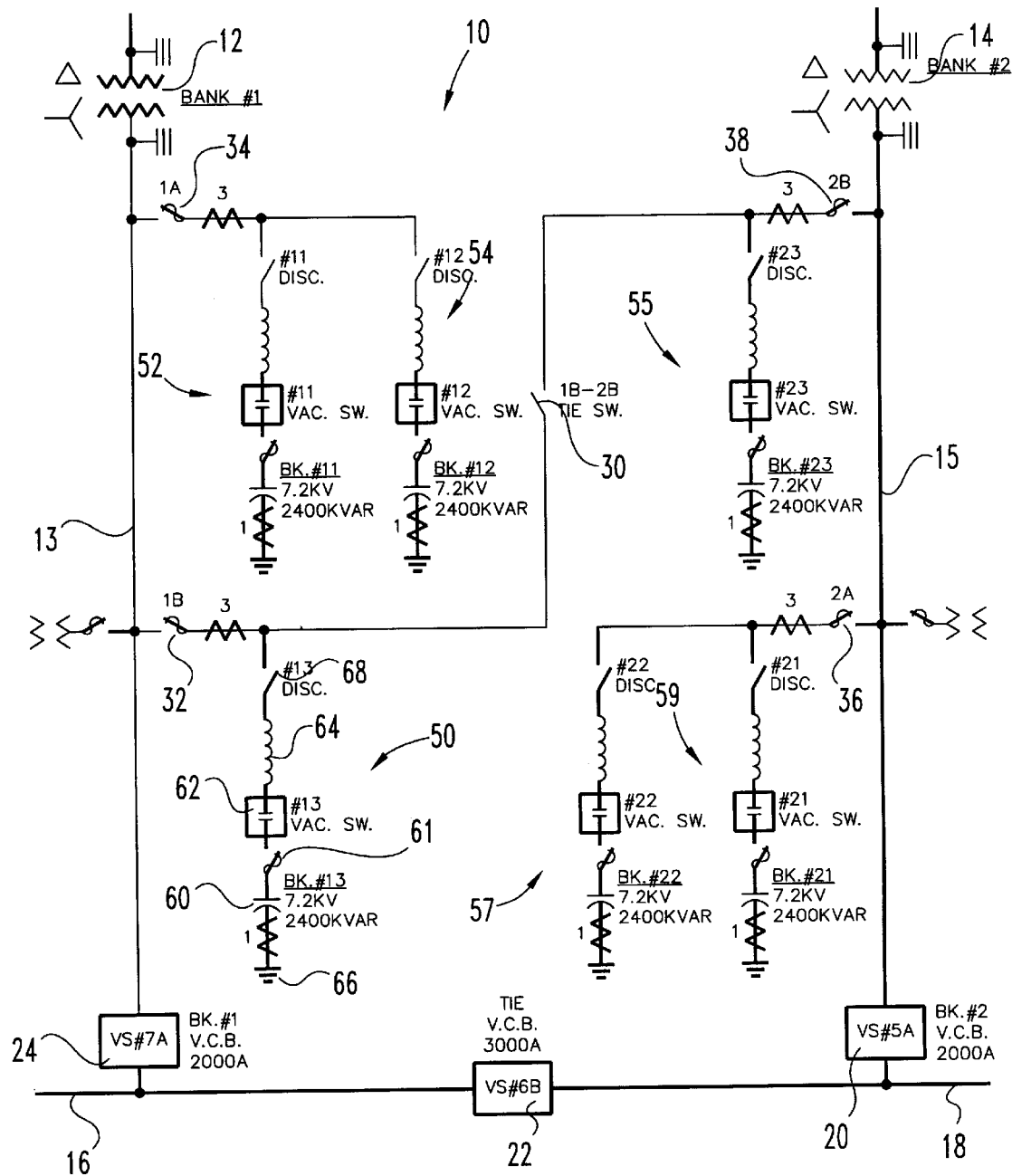
FIG. 1 is a schematic diagram of a power supply circuit with switched capacitor banks.

Illustrated in FIG. 1 is a schematic diagram of capacitor switching circuit 10 having a plurality of capacitor banks 50, 52, 54, 55, 57 and 59. Switching circuit 10 is situated between power supply transformers 16 and 18, and metering current transformers 12 and 14 on first bus 13 and second bus 15. Power supply transformers 16 and 18 are connected to main circuit breakers 20 and 24 with tie circuit breaker 22 between them to allow transformers 16 and 18 to work in parallel or independently. The capacitor banks are similar and each capacitor bank, such as bank 50, has capacitor 60, fuse 61, vacuum switch 62, inductor 64, disconnect 68 and ground 66. For convenience, a capacitor bank is considered with one capacitor, but it will be understood that multiple capacitors could be used. By way of example, each capacitor bank is preferably rated at 2400K VAR and mounted in a capacitor can rated at 12 kV (not shown). In a preferred embodiment, circuit breakers 20 and 24 are rated at 2000 amps and tie circuit breaker 22 is rated at 3000 amps.

Fuses 32, 34, 36 and 38 and switches such as disconnect 68 allow the capacitor banks to be selectively connected or disconnected from circuit 10, in particular situations. Tie switch 30 is located between capacitor bank 50 and capacitor bank 55. Tie switch 30 can be open such that bank 50 is connected to metering current transformer 12 and bank 55 is connected to metering current transformer 14, or tie switch 30 may be closed so that banks 50 and 55 are in parallel and can be connected in tandem to either metering current transformer 12 or 14. In a preferred embodiment, circuit 10 allows capacitance to be varied from 0 to 9600 KVAR in increments of 2400 KVAR for metering current transformer 12 or 14. This allows a greater range of operation and finer voltage control. It also allows individual capacitor banks or groups of capacitor banks to be isolated from the circuit for maintenance such as replacement or service while the remaining banks remain in service. The physical layout of circuit 10 allows the addition of capacitor banks in the future without structural changes.

In a preferred embodiment, it is possible to utilize a standard distribution class capacitor switch 68, which is rated at 200 amps continuous, 12 kA peak transient closing current and 9000 kA asymmetrical making current. The load interrupting current is less than 200 amps and the maximum voltage rating is 15 kV. These switches are readily available from several sources, for example, Cooper type VCS-1 switches. In a preferred embodiment, the 2400 kVAR capacitor banks would draw 112 amps at 12.47 kV voltage. However, the switch should be rated with at least a 35% safety factor. This means that the switch must be rated at a 150 amp minimum (112×1.35=150).

Capacitor banks 50, 52, 54, 55, 57 and 59 are mounted on the same structure and thus are physically mounted close together. Accordingly, the back to back switching currents must be limited to below a peak current. This is addressed by adding inductor or reactor 64 in each phase of each capacitor bank; in a preferred embodiment a 40 $\mu$h inductor rated at 140 amps continuous is used. Capacitor banks 50, 52, 54, 55, 57 and 59 are preferably grounded such as with ground 66 to allow ease of rack construction and faster fuse operation. The capacitor banks could alternatively be ungrounded with expulsion fuses.

Capacitor switching circuit 10 is preferably controlled by a controller such as a programmable logic controller (PLC) with control logic 100 as illustrated in FIGS. 2A–E. In a preferred embodiment, control logic 100 is implemented using two Modicon model no. 612-00 PLCs and a man-machine interface or operator-input device manufactured by KEP, commonly called Zoid.

Figure 2A:
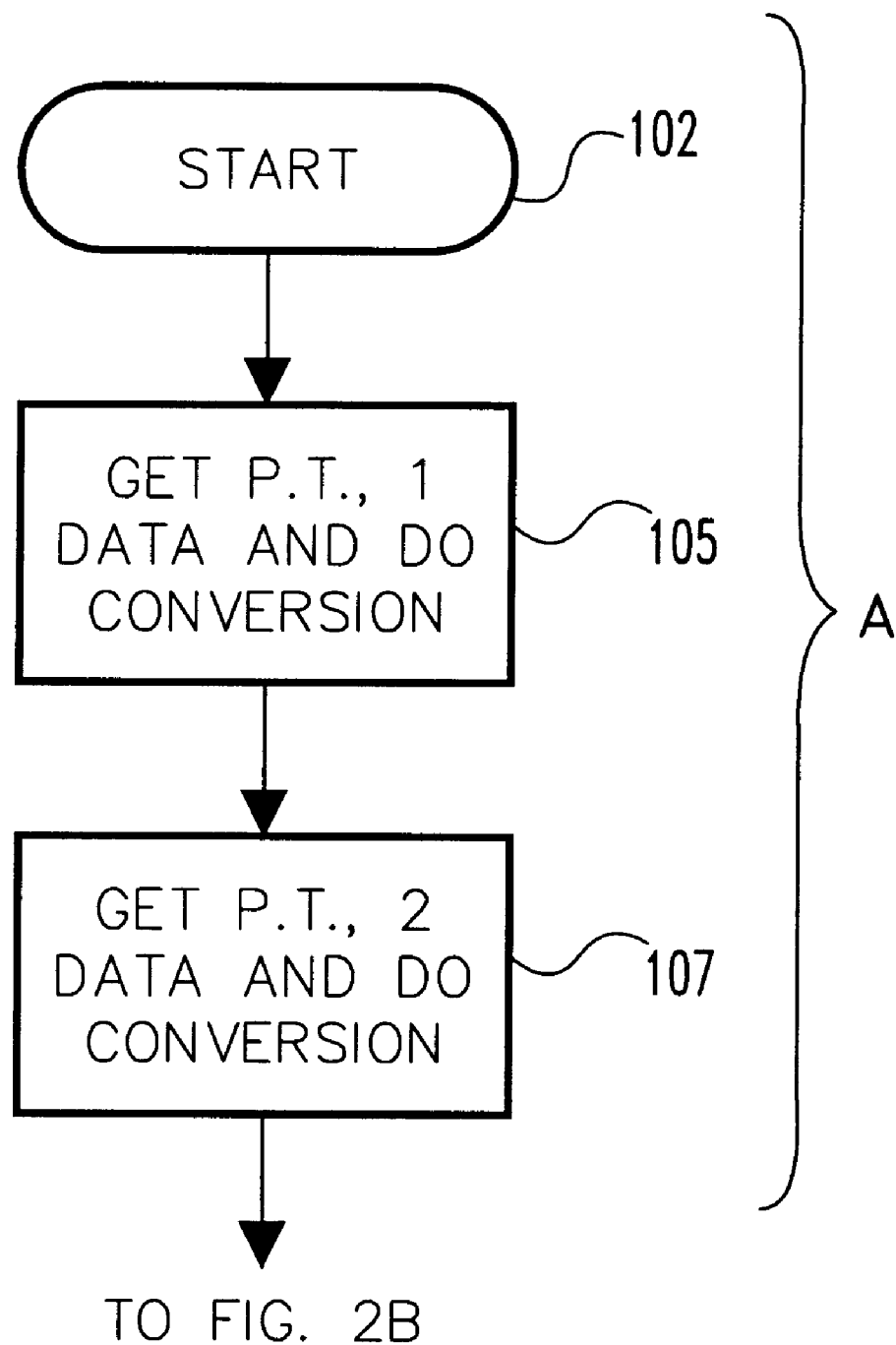
FIGS. 2A–E are a flow diagram of the control logic for switching capacitor banks to optimize the power factor in a power supply system.

In FIG. 2A, section A, from starting status 102, the controller operates to measure 105 and 107 voltages of bus potential transformers 16 and 18. For example, a voltage transducer such as Action Instruments Model G468-0000 may be used. Measured voltages 105 and 107 are filtered through a 60 Hz low pass filter and applied to the controller inputs.

Figure 2B:
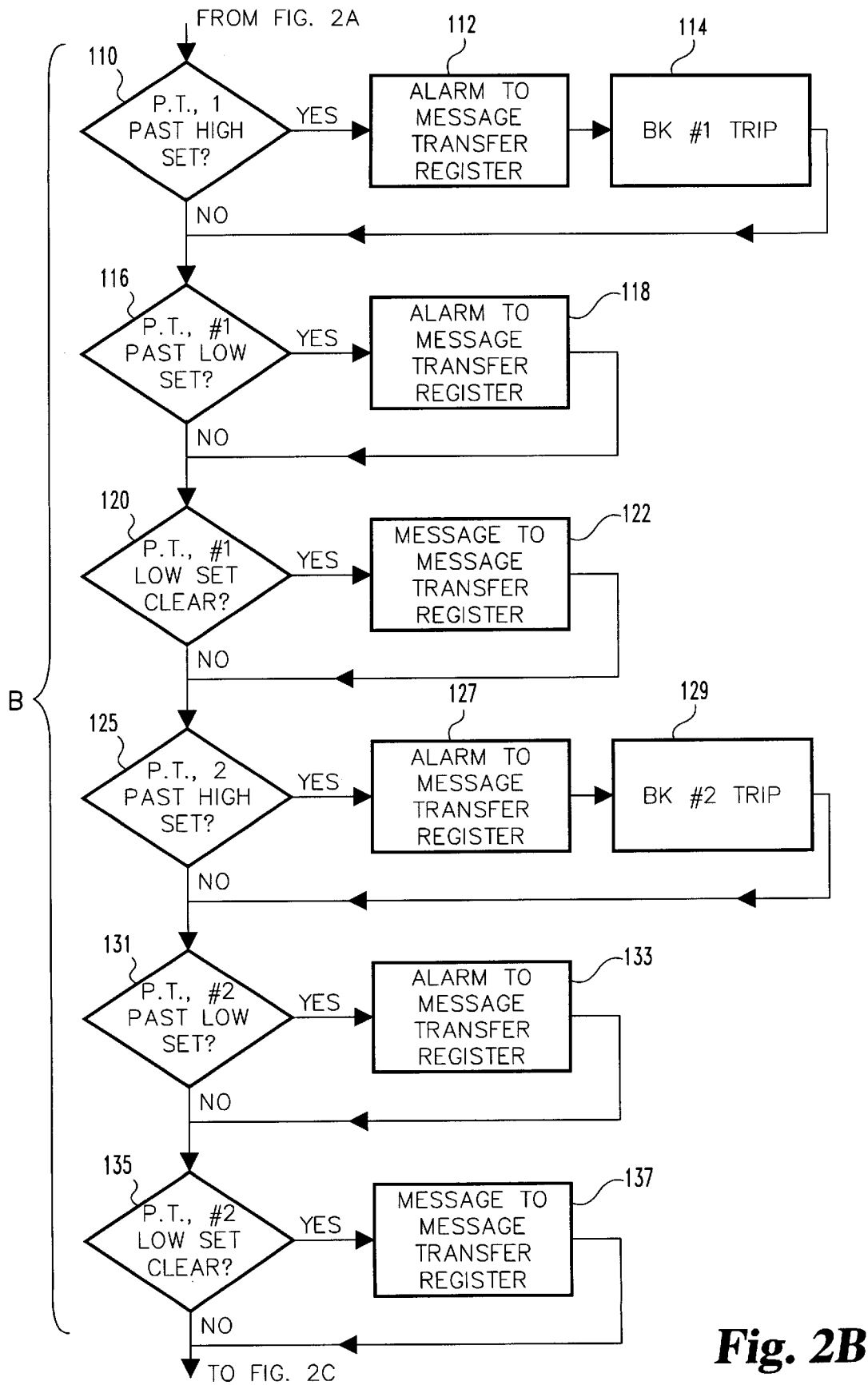

In FIG. 2B, section B, resulting voltage 105 is compared 110 to a predetermined gross high voltage setting. If voltage 105 exceeds the gross high voltage setting, an alarm is reported 112 and the capacitor banks connected to bus potential transformer 16 are tripped 114 or removed from the circuit. Voltage 105 is next compared 116 to a predetermined gross low voltage setting. If voltage 105 is below the predetermined gross low voltage setting, an alarm is reported 118 and the controller blocks operation of the capacitor bank switches. If voltage 105 rises 120 above the gross low voltage setting, a message will be reported 122 and the capacitor switches will be unblocked.

Similarly, resulting voltage 107 is compared 125 to a predetermined gross high voltage setting. If voltage 107 exceeds the gross high voltage setting, an alarm is reported 127 and the capacitor banks connected to bus potential transformer 18 are tripped 129 or removed from the circuit. Voltage 107 is next compared 131 to a predetermined gross low voltage setting. If voltage 107 is below the gross low voltage setting, an alarm is reported 133 and the controller blocks operation of the capacitor bank switches. If voltage 107 rises 135 above the gross low voltage setting, message 137 will be reported and the capacitor switches will be unblocked.

Figure 2C:
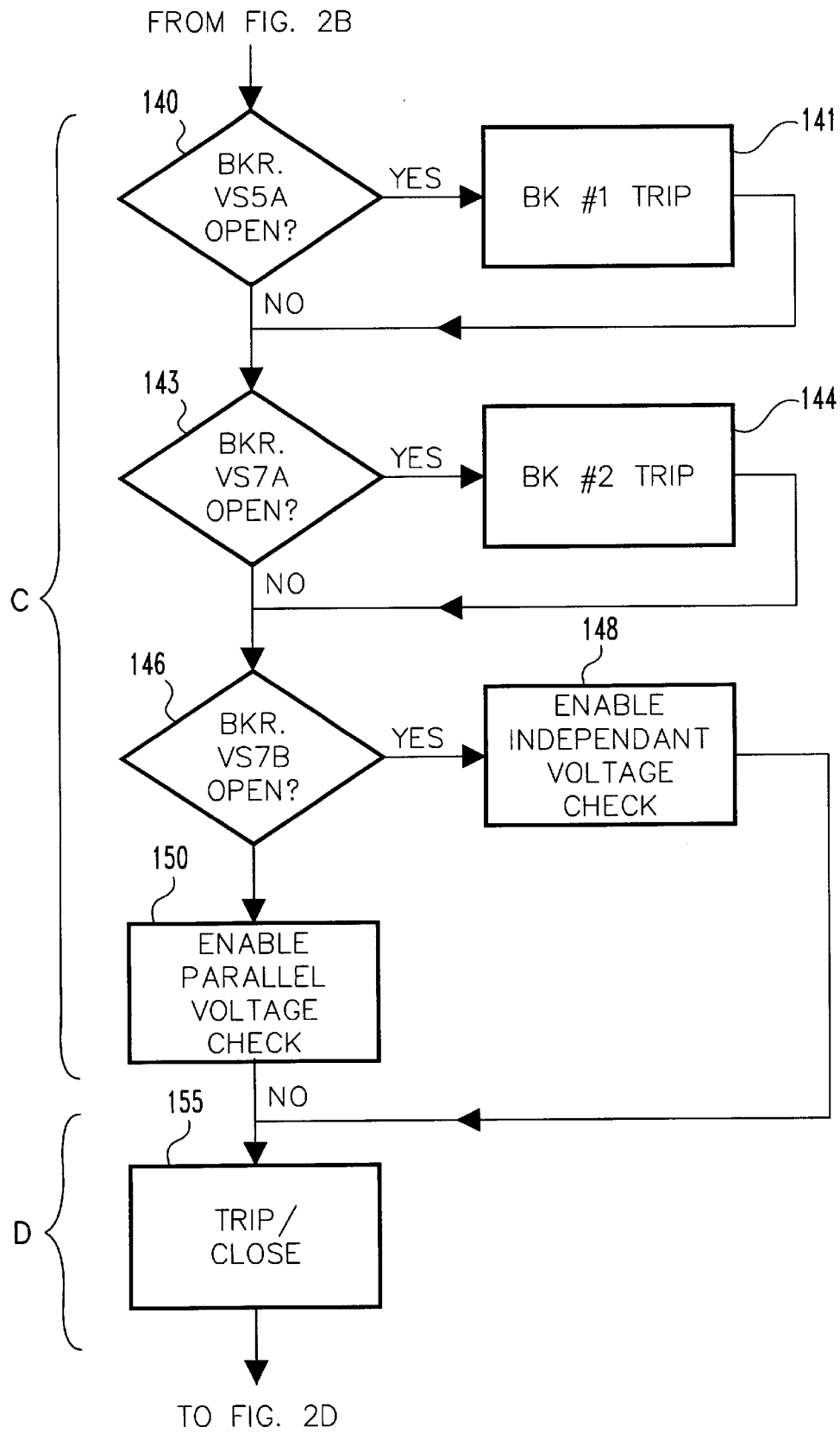
Figure 2D:
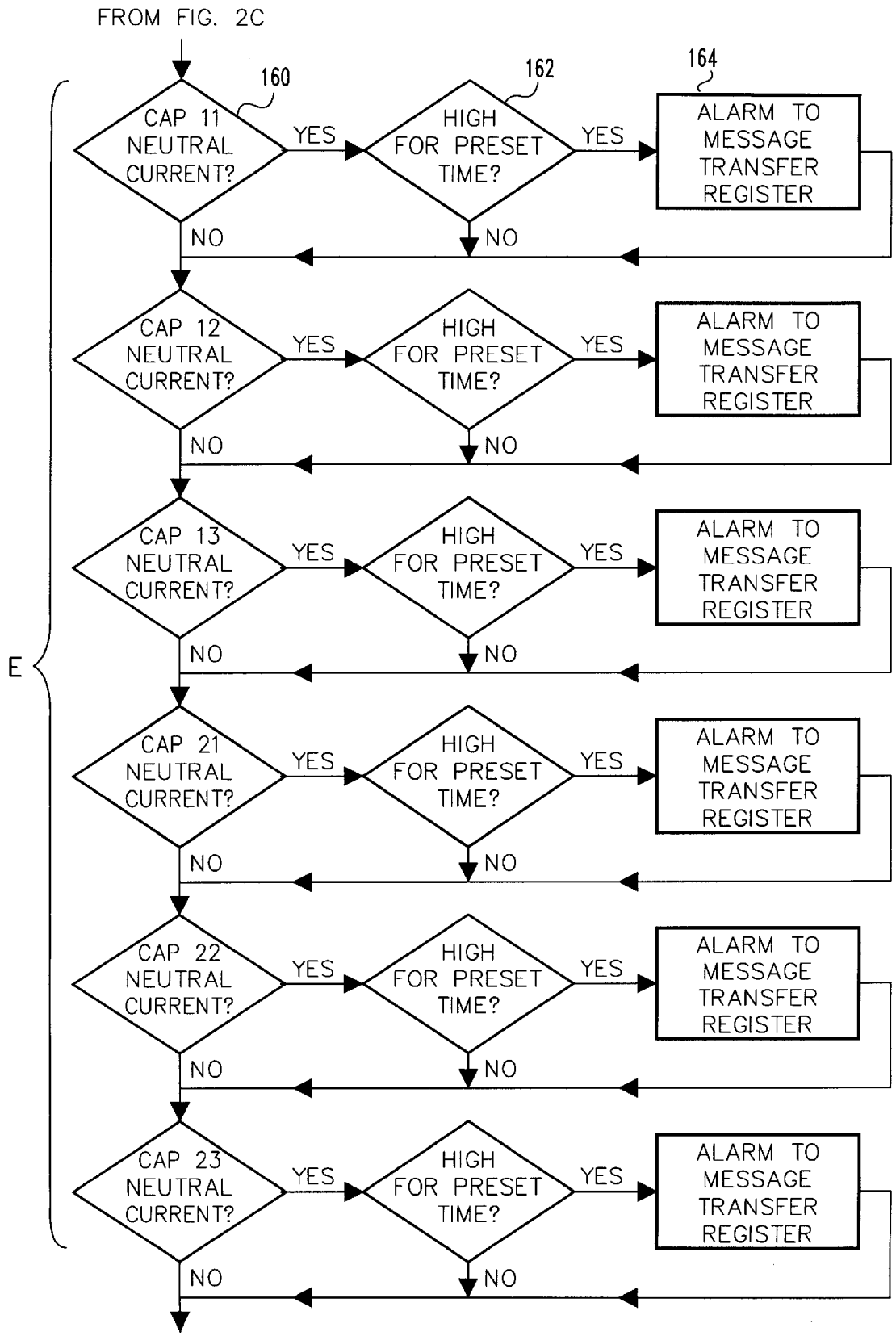
Figure 2E:
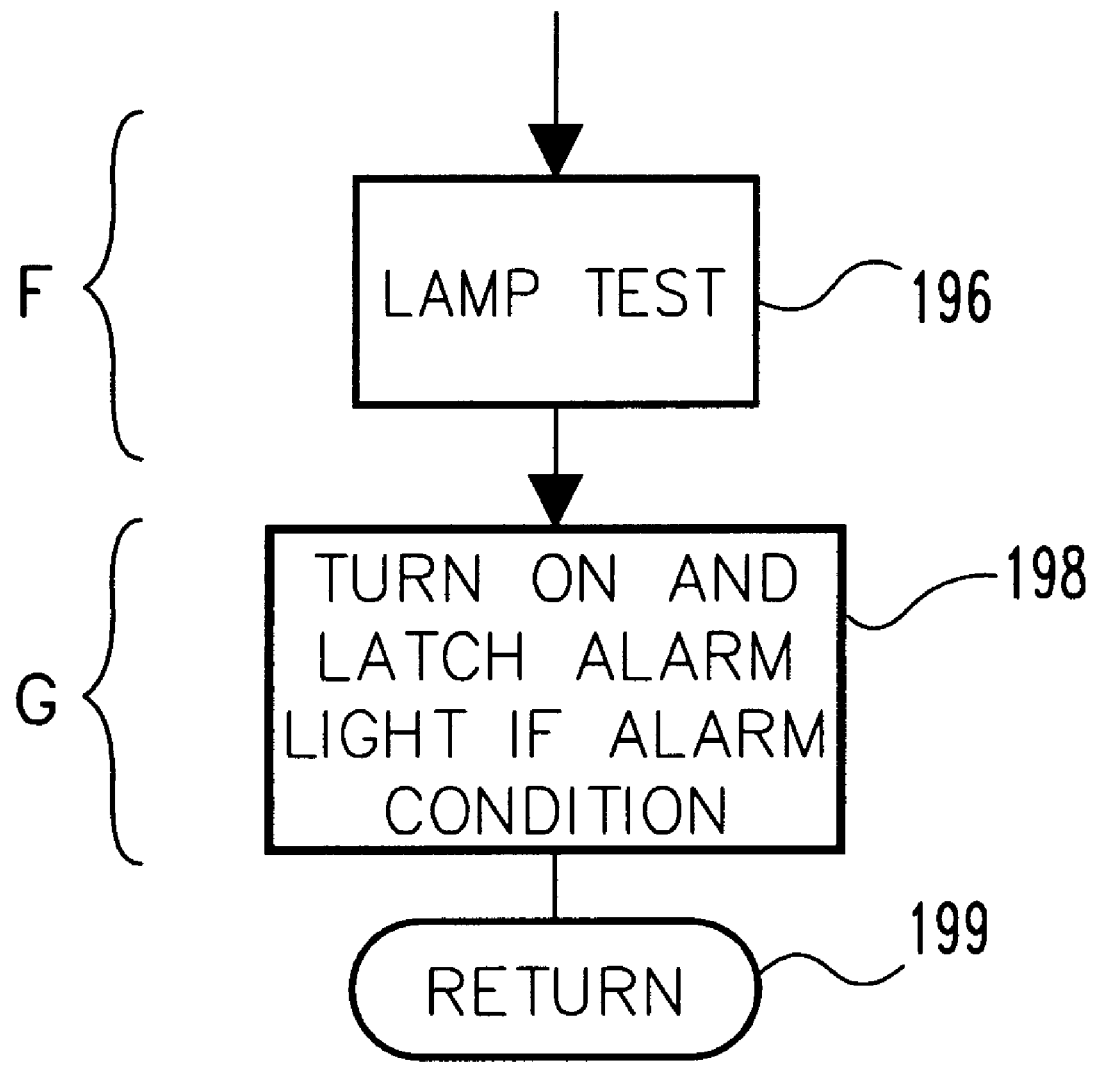

In FIG. 2C, section C, the controller checks 140 and 143 the closed or tripped condition of buses 13 and 15 and breakers 20, 22 and 24. If either breaker 20 or 24 are open, the controller immediately trips or removes 141 or 144 the capacitor banks associated with that bus. This prevents an overvoltage condition when the buses are reenergized. If breaker 22 is open, breakers 20 and 24 will operate independently 148. If breaker 22 is closed, breakers 20 and 24 work with operate with parallel voltage check 150 and the trips and closes will be sequenced in a particular order between the two buses.

In section D, the controller considers the conditions on whether a plurality of capacitor bank should be tripped or closed by comparison 155 of the bus voltages with preset high and low setpoints previously entered. The high and low setpoints define a range within the range defined by the gross high voltage and gross low voltage settings. If voltage 105 or 107 exceeds the high setpoint for that bus, and does so for a preset period of time, the next scheduled capacitor bank switch will be tripped. The voltage is then repeatedly checked on successive passes through the logic, and, if the voltage continues to exceed the high setpoint, additional available capacitor bank switches will be opened. The controller is able to control a plurality of capacitor banks available to the circuit, which exact number may be altered or varied as determined by additional capacitor banks, the tie breakers and the fuses.

Likewise, if bus voltage 105 or 107 falls below the low volts setpoint, and does so for a preset period of time, a close command will be issued and the capacitor bank switch next scheduled to close will do so. The voltage is rechecked, and if it is still abnormal, the next bank in the sequence will close. This process will continue as long as the voltage is abnormal and there are still banks left to operate. A time delay, such as five minutes, is preferably included to allow the capacitors in a bank to discharge before the bank is reenergized. This reduces the stress imposed on the cans due to the switching transient.

The capacitor bank switches can only be operated under certain conditions depending on the current state of the circuit and external factors. In particular, a capacitor trip command can be executed under the following conditions:

A1—The capacitor bank must be presently closed.
A2—The capacitor bank must not have been locked out as a consequence of a previous trip or close malfunction.
A3—The associated bank breaker has tripped. In this case, all of the banks on this bus will be immediately tripped.
A4—A gross overvoltage condition exists on the bus. This condition will also result in all of the banks on the associated bus being tripped.
A5—If a high voltage condition has been detected, a capacitor bank will be tripped if it is the next bank in the trip sequence.
A6—If the "man/auto" switch is in manual and the manual control switch for a capacitor bank is switched to the trip position.

A close command can be executed under the following conditions:

B1—The bank is presently tripped.
B2—More than 5 minutes has elapsed since the bank was tripped. This is to allow the bank to fully discharge before it is switched back into the system. This condition also applies for manual operation.
B3—The associated bank breaker is closed. This condition applies only in automatic operation.
B4—If a low voltage condition has been detected, a capacitor bank will be closed if it is the next bank in the close sequence.
B5—A capacitor bank may be closed in manual mode if the "auto/man" switch is in the "man" position and the manual control switch associated with that bank is switched to the "close" position. The other criteria for this mode of operation has already been mentioned.

Capacitor banks 50 and 55 deviate from the other banks in that they may both be switched to either bus, or one on each bus as is normal. This is accomplished by manually switching the bank over to the desired bus in the yard using tie-switch 30, then changing the position of the capacitor bank bus selector switch on the panel. The capacitor bank controller automatically changes its switching sequence to accommodate the desired mode of operation.

Once the capacitor banks have been switched, the controller checks the neutral current of the capacitor banks in section E in case a fuse blows or a phase is not switched in correctly as a consequence of a switch malfunction. A current transducer is used in series with each capacitor bank's neutral lead. In a preferred embodiment a Honeywell Micro-Switch (Cat CSLESJG) is used to act as a current transducer. If a current imbalance is detected 160 in capacitor bank 50, and remains high for a preset period of time 162, an alarm message will be sent 164. This is repeated for each capacitor bank 52, 54, 55, 57 and 59.

In a preferred embodiment, a programmable logic controller is used to implement the control logic. Although a microprocessor could be used, a PLC is more preferred for simplicity and speed. In particular, a PLC provides flexibility for a specific design yet allows future changes with simple software updates. A PLC can be configured to provide diagnostic information or sequence of event recording as well as alphanumeric or hardcopy outputs. There has not previously been a commercially available PLC incorporating all of these advantages. In a preferred embodiment the Zoid controller has a number of LED indicators which may be tested 196 in FIG. 2E, section F by pressing the "Lamp Test" button on the Zoid. The lights will flash for four seconds if operational. The bus potential indicators and the PLC indicator are not tested since these indicators are normally on. In a preferred embodiment, manual switches are used to operate the capacitor bank switches in case the PLC fails.

Another feature of the Zoid, in section G, is that the alarm light is latched on 198 if the Zoid malfunctions and an alarm condition occurs. This light will remain on until cancelled by the "alarm acknowledge" button or the "alarm reset" button. Once the cycle of control logic 100 is complete 199, the system will revert to start status 102 and repeat the cycle.

For purposes of illustration, the following settings were used with control logic 100. It will be understood that these are examples only and will be varied for specific situations as understood by those of skill in the art.

Trip high setpoint voltage—122V
Close low setpoint voltage—119V

Time delay—60 seconds

Gross high voltage trip—126 V with a 0.5 second delay

Gross low voltage—107 V with a 0.5 second delay

Switch failure set for 10 seconds

Unbalance alarm delay 10 seconds

Unbalance set point 40 primary amps

Additionally, it is preferred to have a printer or other output device connected to the controller for reporting alarms or messages and associated information such as time, date and circuit conditions. The output device can provide information onsite or could communicate with a remote location. It is also preferred that the controller have a port to which a computer or other device could connect for testing, analysis or reprogramming.

The controller follows the control logic in FIGS. 2A–E to trip or connect capacitor banks in order to more nearly maintain a constant AC supply voltage. The controller incorporates the additional control logic 200 in FIGS. 3A–D to prevent damage to the capacitor banks in the event of excessive total harmonic distortion after a capacitor bank is switched.

Figure 3A:
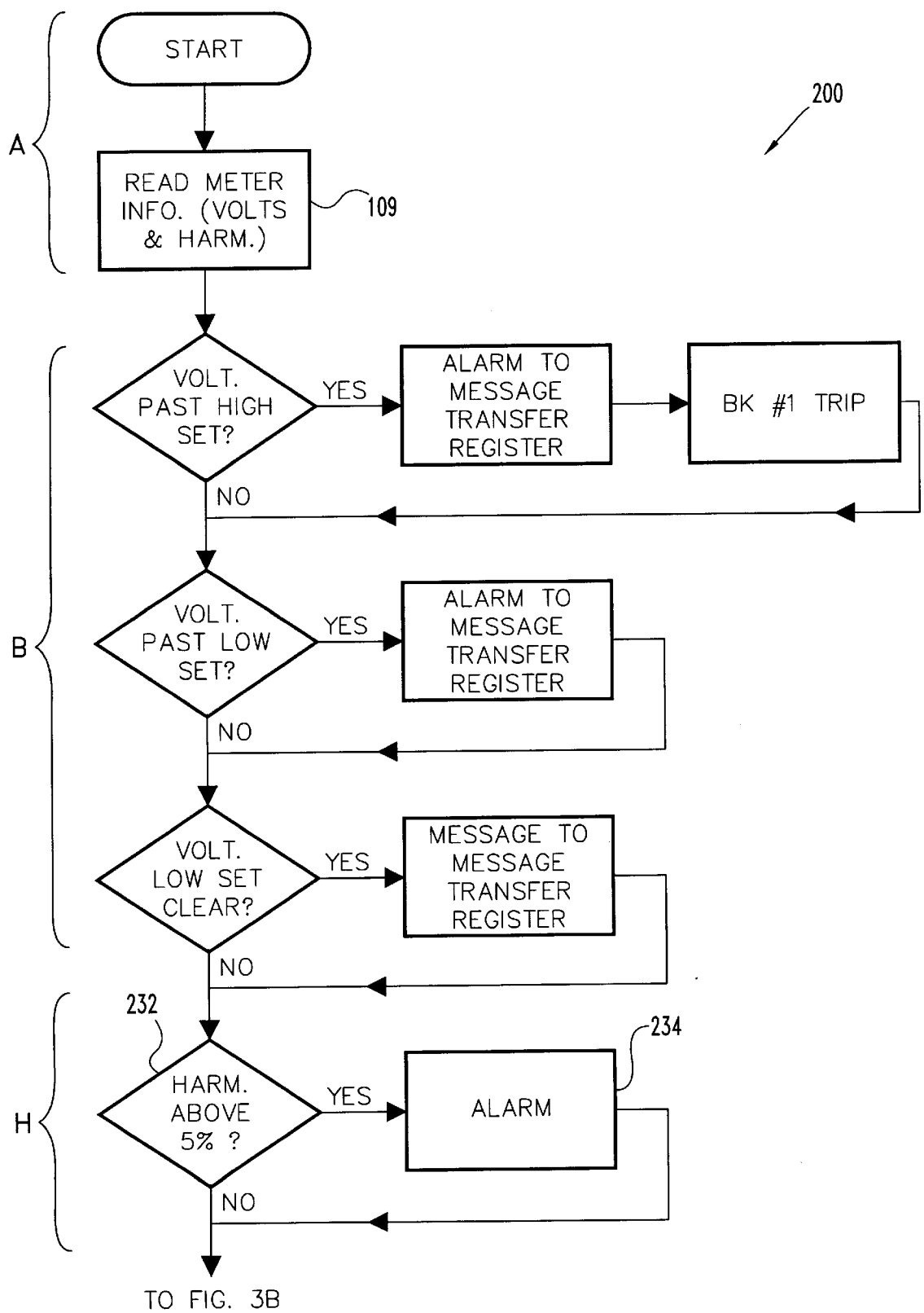
FIGS. 3A–D are a flow diagram of the control logic for switching capacitor banks to minimize total harmonic distortion in a power supply system.

From the initial starting status in FIG. 3A, a meter is used to measure 109 the harmonic distortion or THD in the system. In a preferred embodiment a Bitronics Meter with a ModBus protocol output that measures the THD as well as volts, power factor, watts, individual harmonics, etc. is used. Control logic 200 then compares the measured voltage against a gross high voltage and a gross low voltage as described in Section B of control logic 100. The preferred Bitronics Meter displays the THD, but it will be understood that THD can be measured in multiple ways such as by calculating the total based on a specific measured harmonic or by measuring the distortion after discounting the fundamental. Measuring the THD is intended to encompass these and other methods of measuring the harmonic distortion in a system. The invention is equally applicable if only individual harmonics are measured or the THD is calculated based on other measurements.

Section H compares 232 the measured THD to an alarm threshold such as five percent (5%). If the THD exceeds the alarm threshold, an alarm is reported 234. The electrical customer may then take appropriate action to correct the problem, or in a worst case the customer may be tripped off of the system.

Figure 3B:
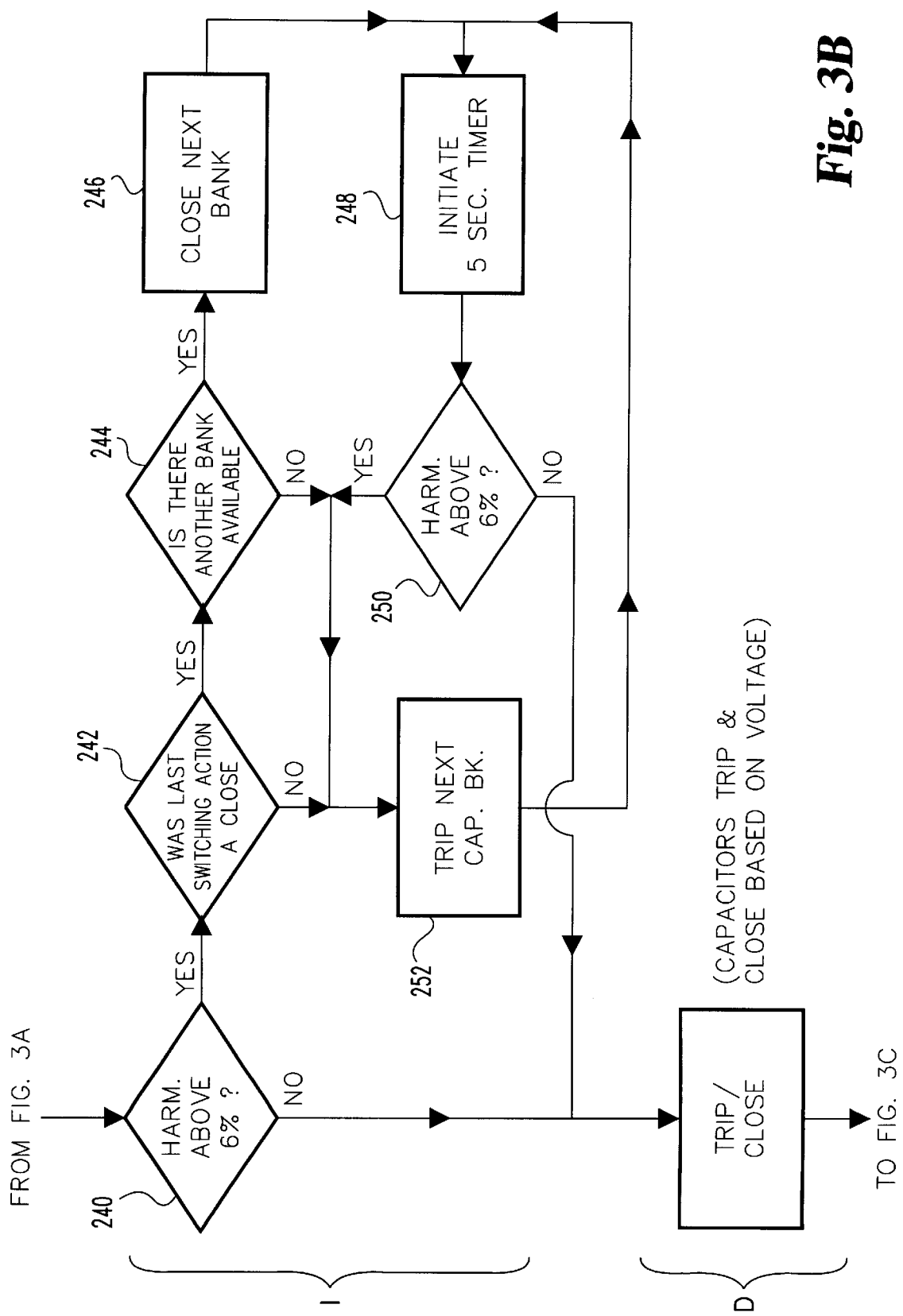
Figure 3C:
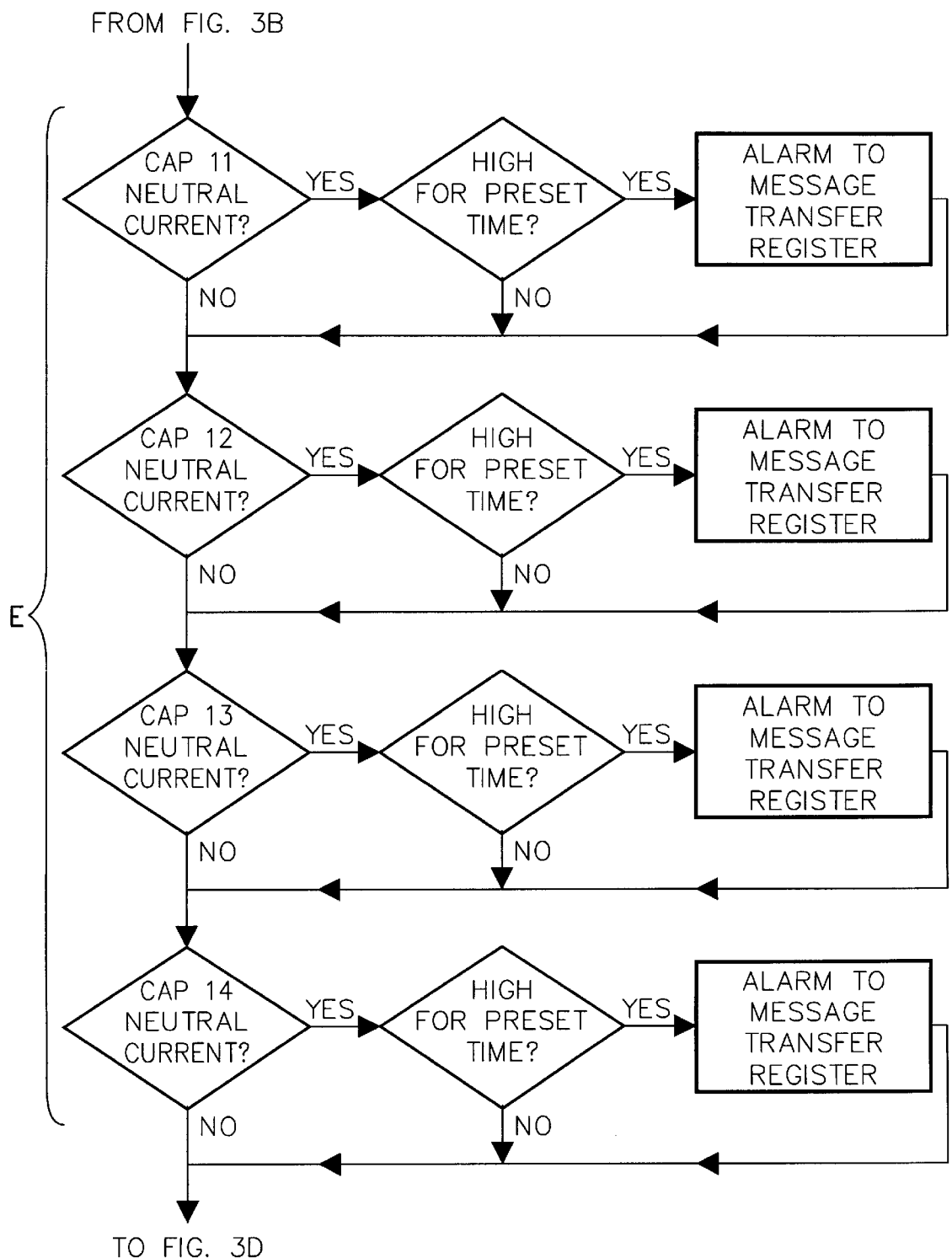
Figure 3D:
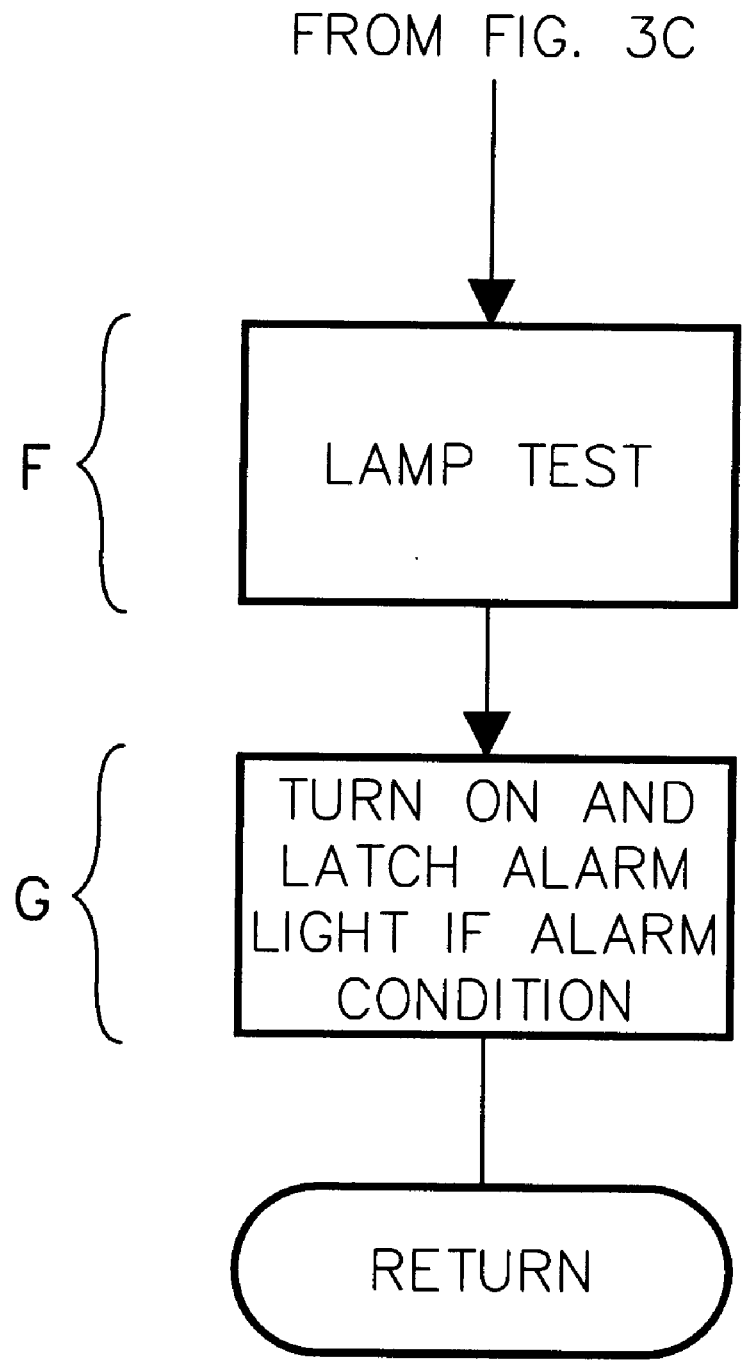

The controller then proceeds to Section I in FIG. 3B where the controller takes protective action if the THD exceeds an action threshold such as six percent (6%). The controller compares 240 if the THD exceeds the action threshold for a predetermined period of time. If the THD falls, no action is taken. If the THD exceeds the action threshold for a predetermined period of time, the controller checks 242 if the last switching action was a close. If check 242 shows that the last action was a close, the controller checks 244 if another capacitor bank is available. When check 244 shows that a capacitor bank is available, the controller closes 246 the available bank and initiates a timer 248, preferably a five second timer. The added capacitor bank should eliminate the possibility of the capacitor bank being near the natural resonance frequency of the system. If the last switching action was not a close, the controller will not close any additional capacitor banks, but will trip 252 the next capacitor bank and initiate the timer 248.

After the timer expires, the controller compares 250 the THD to the action threshold. If the THD continues to exceed the action threshold, the next connected capacitor bank is tripped 252 and the timer is again initiated 248. Comparison 250 of the THD to the action threshold and tripping 252 of available banks continues until the THD falls below the action threshold or all capacitor banks are removed from the system. Control logic 200 then continues through sections D, E, F and G in FIGS. 3C and D as previously described in control logic 100.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A system for minimizing total harmonic resonance in an AC power line after a capacitor bank is switched into or out of the line for power factor correction in response to a reactive current condition in the line, comprising:

(1) a detector for detecting the harmonic distortion in a supply line;

(2) a plurality of capacitor banks in parallel to the supply line;

(3) a plurality of switches wherein at least one switch is in series with each of said capacitor banks to selectively connect or disconnect each of said capacitor banks to the supply line; and, (4) a controller operatively coupled to said switches and responsive to a value of distortion from said detector wherein said controller compares the harmonic distortion to an action threshold and switches said capacitor banks to reduce the harmonic distortion and protect said capacitor banks when the harmonic distortion exceeds the action threshold for a predetermined period of time.

2. The system of claim 1 wherein if a capacitor bank was last connected and the harmonic distortion exceeds said action threshold for a predetermined period of time, said controller closes one switch to connect one of said capacitor banks.

3. The system of claim 2 wherein if a capacitor bank connection was last disconnected or said one switch was closed, and the detected harmonic distortion continues to exceed said action threshold, said controller sequentially disconnects the connection of each of said plurality of switches at predetermined time intervals.

4. The system of claim 3 wherein said controller switches said capacitor banks to more nearly maintain a constant voltage.

5. The system of claim 4 wherein said controller includes at least one programmable logic controller.

6. The system of claim 5 comprising an output device for reporting messages or alarms from said controller.

7. The system of claim 6 wherein said output device is a printer.

8. The system of claim 4 wherein each of said capacitor banks has a capacitor, a switch and an inductor.

9. The system of claim 8 wherein each of said capacitor banks has a reactive power of 2400 KVAR.

10. A method for minimizing resonance in an AC supply line comprising the steps of:

(1) detecting the harmonic distortion in a system after a capacitor bank is switched to correct the power factor, said system including a plurality of additional capacitor banks which may selectively be connected and disconnected from said system;

(2) comparing the harmonic distortion to an action threshold;

(3) connecting one of said plurality of capacitor banks to said system if the detected harmonic distortion in step (1) exceeds said action threshold for a predetermined period of time and the capacitor bank switch to correct the power factor was a connection;

(4) disconnecting one of said plurality of capacitor banks from said system if the total harmonic distortion continues to exceed said action threshold for a predetermined period of time after connecting step (3); and (5) repeating said disconnecting step until the total harmonic distortion is less than said action threshold or until said plurality of capacitor banks are disconnected from said system.

11. The method of claim 10 further comprising the steps of:

(6) detecting the voltage in said system;

(7) connecting one of said plurality of capacitor banks to said system if the voltage falls below a close voltage setpoint for a predetermined period of time;

(8) disconnecting one of said plurality of capacitor banks from said system if the power factor exceeds a trip voltage setpoint for a predetermined period of time; and (9) repeating said connecting and disconnecting steps until the power factor is between the close voltage setpoint and the trip voltage setpoint.

12. The method of claim 11 wherein said comparison step is done by at least one programmable logic controller.

13. The method of claim 12 further comprising step (10) of reporting an alarm to an output device when said threshold value is exceeded or when one of said plurality of capacitor banks is connected or disconnected.

14. The method of claim 11 further comprising step (11) of isolating at least one capacitor bank from the system for maintenance while the remaining capacitor banks remain in service.

* * * * *